US006621676B2

(12) United States Patent
Barton et al.

(10) Patent No.: US 6,621,676 B2
(45) Date of Patent: Sep. 16, 2003

(54) METHOD AND APPARATUS TO OPPOSE A SHORT CIRCUIT FAILURE MECHANISM IN A PRINTER DRIVE CIRCUIT

(75) Inventors: E. Lewis Barton, Corvallis, OR (US); Charles R. Headrick, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/020,057

(22) Filed: Oct. 30, 2001

(65) Prior Publication Data

US 2003/0081367 A1 May 1, 2003

(51) Int. Cl.[7] .......................... H02H 9/02; H02H 3/20; H02H 9/04

(52) U.S. Cl. .......................... 361/93.1; 361/91.7

(58) Field of Search .......................... 361/91.7, 138, 361/93.1; 347/81, 58, 62, 59, 57

(56) References Cited

U.S. PATENT DOCUMENTS 4,439,776 A * 3/1984 Zeiler .......................... 346/75
5,164,747 A * 11/1992 Osada et al. .......................... 346/140
6,039,428 A * 3/2000 Juve .......................... 347/19
6,290,333 B1 * 9/2001 Wade et al. .......................... 347/50
6,431,678 B2 * 8/2002 Beck et al. .......................... 347/393

* cited by examiner

*Primary Examiner*—Gregory J. Toatley, Jr.
*Assistant Examiner*—Zeev Kitov

(57) ABSTRACT

An apparatus and method of use opposes a short circuit failure mode in a printer having a printhead controller circuit driving an address bus connected to two or more printheads. A failure protection circuit associates one resistor group with each address line within the address bus that extends into at least two printheads. In particular, one address line resistor is placed in series between the address lead extending from a head driver IC within the printhead controller circuit and each printhead into which the address line extends. Where an address line shorts, the associated address line resistor protects the head driver IC from the short, allowing it to control the voltage potential of that address line in any printhead that has not failed. The user is then able to identify and replace the non-functioning printhead.

13 Claims, 5 Drawing Sheets

METHOD AND APPARATUS TO OPPOSE A SHORT CIRCUIT FAILURE MECHANISM IN A PRINTER DRIVE CIRCUIT

TECHNICAL FIELD

This disclosure relates to a method and apparatus to oppose a short circuit failure mechanism in a printhead drive circuit of a printer, and to provide a means to distinguish between failed and non-failed printheads.

BACKGROUND

It is common for an inkjet printer to have both a black printhead (pen) and also a tri-color pen. By providing two pens, either color or monochromatic documents may be printed. To lower costs, it is common for a single control circuit to be used in the management of both pens. Such a circuit, commonly including a single integrated circuit (IC) known as a head driver, is typically contained within a central location and connected to each pen. Address lines, controlled by the head driver, extend into both pens, allowing any nozzle within either printhead to be selected. Following selection of a nozzle address, a pulse of current may be sent to the desired nozzle using black or color "primitives," i.e. wires which transmit a pulse of current to firing resistors associated with the nozzle selected by the address lines.

A failure mechanism associated with such printheads results when ink becomes located in a position that results in a short circuit, typically between an address line and ground. Because of the electrical conductivity between the address lines between at least two printheads, when an address line is shorted to ground in one printhead, a plurality of printheads may fail to operate. Moreover, it is difficult to determine in which printhead the short circuit is located. As a result, the printer is completely disabled, and repair costs are increased.

An engineering solution that is used, and which provides immediate information on the location of the short circuit—i.e. the printhead containing the short circuit—is to provide a head driver IC or an entire control circuit for each pen. This solution also allows the non-disabled head to operate. Unfortunately, this results in greater cost, due to the need for two head driver ICs.

Accordingly, a solution is needed to cope with a failure within a first printhead, which allows other printheads within the printer to operate. The solution should not require a second head driver IC, and should allow easy discovery of the identity of the printhead in which the failure occurred.

SUMMARY

In a typical inkjet printer configuration, one black and one tri-color printhead are provided. In such a configuration, address lines in communication with a single head driver IC extend into both printheads. A failure protection circuit associates one resistor group of address line resistors with each address line. In one implementation, one address line resistor is placed in series between the address lead extending from the head driver IC and each printhead into which the address line extends.

A common failure mechanism results when ink within one of the printheads causes a short, tying one of the address lines to ground. Without the failure protection circuit, the conductivity of the address lines between two or more printheads would cause a failure in all printheads. However, the address line resistor within the failure protection circuit, associated with both the shorted address line and the printhead wherein the failure occurred, begins to function as a pull-down resistor. Accordingly, the head driver IC is able to control the voltage potential of that address line in each printhead wherein no failure was experienced. The user is then able to identify and replace the non-functioning printhead.

BRIEF DESCRIPTION OF THE DRAWINGS

The same numbers are used throughout the drawings to reference like features and components.

DETAILED DESCRIPTION

An apparatus and method of use opposes a short circuit failure mode in a printer having a printhead controller circuit connected to two or more printheads, which in a typical implementation includes one black and one tri-color printhead. In such a configuration, address lines in communication with the printhead controller circuit extend into the two or more printheads. A failure protection circuit associates one resistor group with each address line. In particular, one address line resistor is placed in series between the address lead extending from a head driver IC within the printhead controller circuit and each printhead into which the address line extends.

A common failure mechanism results when ink within one of the printheads causes a short, tying one or more of the address lines to ground. Due to the conductivity of address lines between printhead, this would otherwise cause a failure in all printheads. However, the address line resistor, associated with both the shorted address line and the printhead wherein the failure occurred, begins to function in a manner similar to a pull-down resistor, thereby allowing the head driver IC to control the voltage potential of that address line in any printhead that has not failed. The user is then able to identify and replace the non-functioning printhead.

Figure 1:
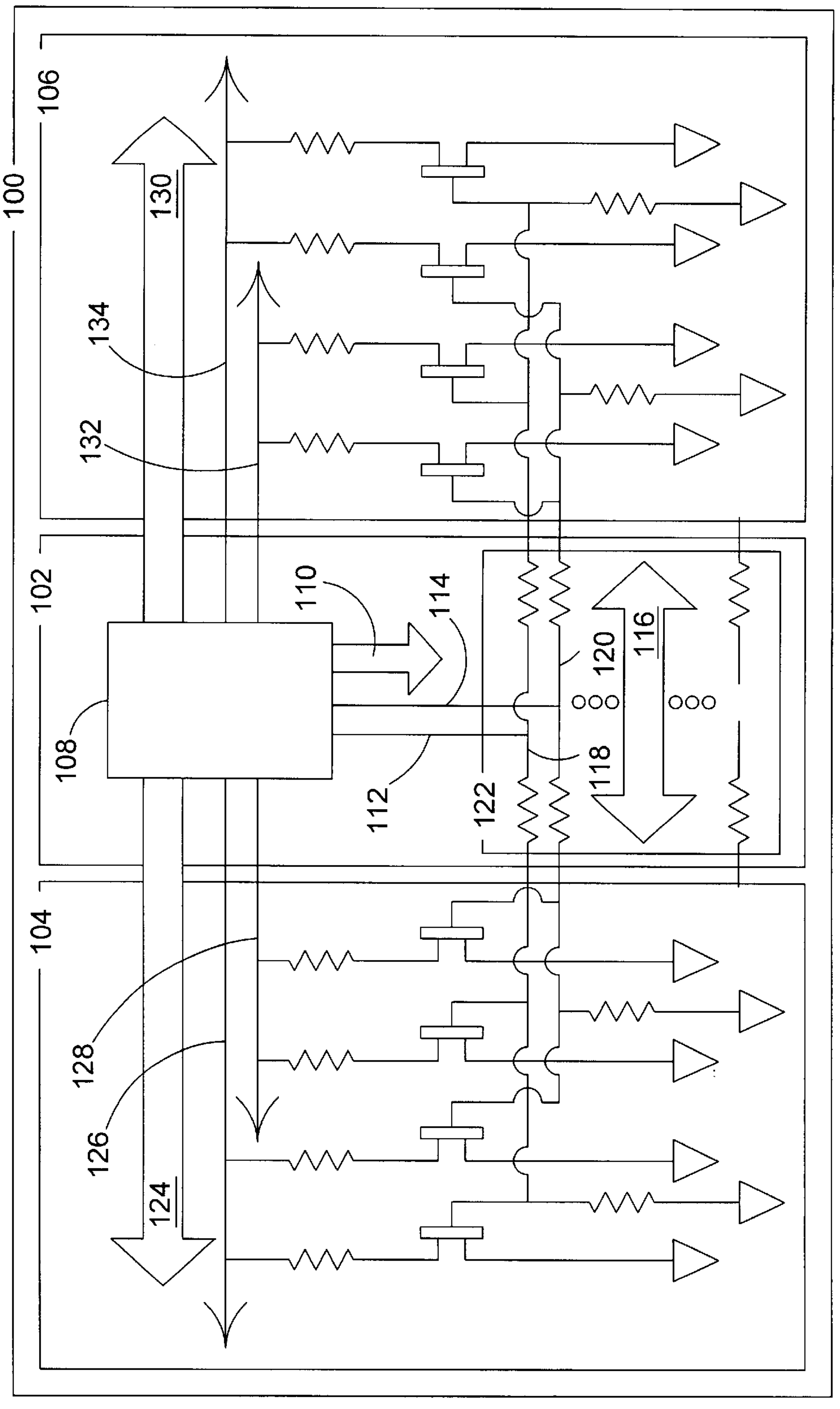
FIG. 1 is a circuit schematic illustrating an exemplary printhead controller circuit, two printheads and an exemplary failure protection circuit.

FIG. 1 shows a schematic 100 associated with an ink jet printer having both a black printhead and a tri-color printhead. In an alternate implementation, a different number of black and/or color printheads could be included, while utilizing similar circuitry. A printhead controller circuit card 102 is typically located within the printer in an area that is generally protected from exposure to ink and other contaminates. Black printhead circuitry 104 and color printhead circuitry 106 are contained within their respective printheads.

Continuing to refer to FIG. 1, the controller card circuitry 102 includes an integrated circuit 108, typically known as a head driver. The head driver operates, or drives, the circuits in the black printhead and the tri-color printhead. Extending from head driver is an address lead bus 110, wherein only first and second address leads 112, 114 are shown individually for reasons of illustrative clarity.

An address line bus 116 is formed by a plurality of address lines that connect to the firing resistors associated with the individual nozzles within the two or more printheads. For reasons of illustrative clarity, only two address lines 118, 120 of the address bus 116 have been illustrated. Each address line provides electrical continuity between the black printhead circuitry 104 and the color printhead circuitry 106. This facilitates control over the addressing of each circuit 104, 106 with one head driver IC. Connection of the address leads to the address lines allows the address lead bus 110 to drive the address line bus 116.

The address lines are protected by a failure protection circuit 122. As will be seen in greater detail below, the failure protection circuit addresses a failure mechanism by which address lines are tied to ground or other undesired electrical potential by undesired ink accumulation within the printhead circuitry. An exemplary failure protection circuit 122 is confined within a region of the printer that is protected from contamination, and which is typically separated from ink and areas wherein the chance of contamination is greater.

The head driver IC also includes outputs called "primitives" that drive the firing resistors of the nozzles of the printheads. A black printhead primitive bus 124 includes a plurality of black printhead primitives, including two primitives 126, 128 that are shown separated from the bus to illustrate their deployment in an exemplary circuit within the black printhead. A color printhead primitive bus 130 is similarly constructed, including two color primitive lines 132, 134 that are shown separated from the bus to illustrate their deployment in the exemplary circuit.

Figure 2:
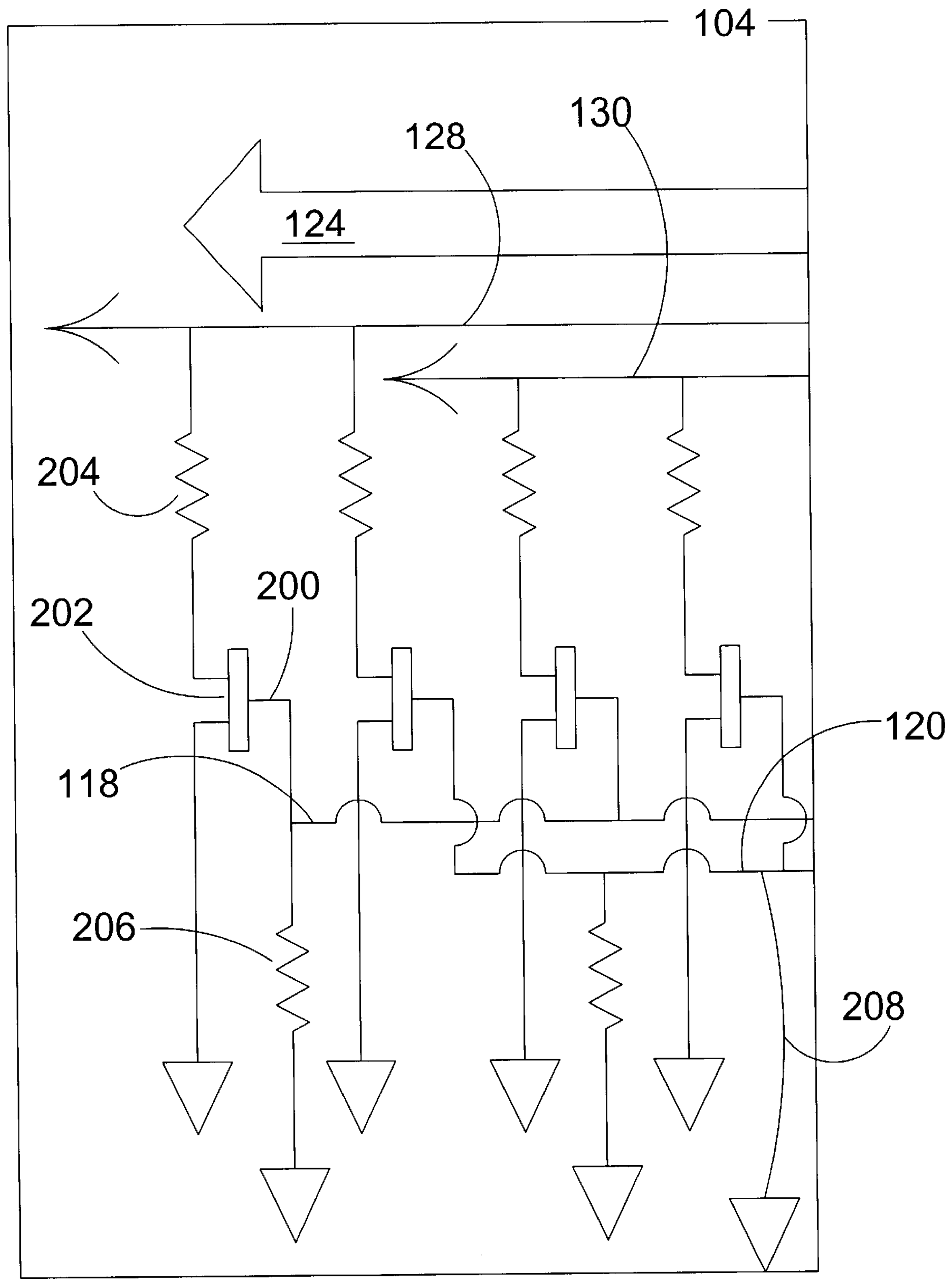
FIG. 2 illustrates an enlarged view of one of the printhead portions of the circuit schematic of FIG. 1, wherein an exemplary failure mechanism has resulted in a short between an address line within one printhead and ground.

FIG. 2 shows an enlarged view of the black printhead circuitry 104. The circuitry for an additional black printhead, a color printhead or tri-color printhead is typically similar. In the implementation of FIG. 2, each address line 118, 120 of the address bus is attached to the gate 200 of one or more FET transistors 202 or similar switching device. In this manner, the state (i.e. ON or OFF) of the FET may be controlled by the address bus controlled by the head driver IC.

The FET 202 or similar switching device allows current to be passed through the firing resistors 204 associated with each nozzle within the printhead. To provide the current required for operation, each firing resistor is attached to "primitive" 128 or 130, from the bus 124 extending from the head driver IC.

With the address line 118 selected, the FET 202 allows current passage through the firing resistor 204. Having enabled the passage of current with signals transmitted via the address bus, the head driver IC may send a pulse of current through the associated primitive 128 and firing resistor 204. By sending a burst of current on the primitive, the firing resistor activates the nozzle with which it is associated within the printhead, thereby transferring ink to the media.

Pull-down resistors 206, carried on the address lines, prevent the voltage potential of the address lines from floating by pulling the voltage potential of the address lines down to ground, unless the head driver applies a high voltage signal (e.g. 5 volts) to the address line. In that case, a voltage drop forms over the pull-down resistor, and the electrical potential of the address line is elevated.

A failure mechanism by which one or more address lines may become tied to ground is illustrated. An exemplary short 208 results when ink build-up forms an electrical connection between an address line and other components. The short 208 pulls the electrical potential on the address line down to ground, thereby preventing the head driver IC from controlling the FETs 202.

Figure 3:
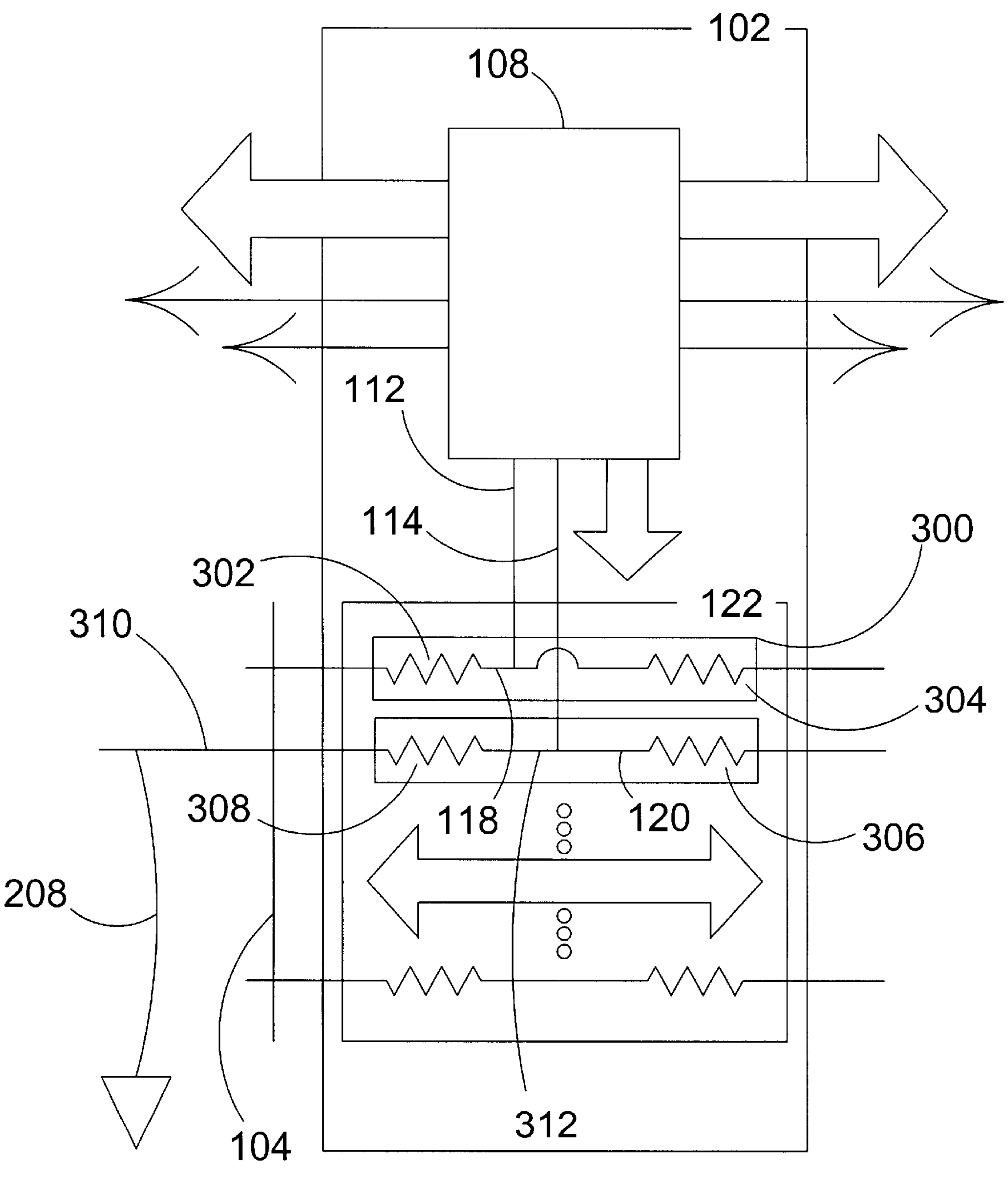
FIG. 3 illustrates an enlarged view of the printhead controller circuit portion of the circuit schematic of FIG. 1.

FIG. 3 shows an enlarged view of the controller card circuit 102. The failure protection circuit 122 prevents a short, located within one printhead circuit from impacting the functionality of other printhead circuits. For example, if a short causes a failure in the black printhead circuit, the color printhead circuit will continue to function.

An exemplary failure protection circuit 122 contains a plurality of resistor groups 300. Each of the exemplary resistor groups is associated with one address line, which extends into two printheads. The resistor group 300 includes a first address line resistor 302 associated with a first printhead and a second address line resistor 304 associated with a second printhead. The number of resistor groups may be equal to the number of address lines that extend into more than one printhead. The number of resistors in each resistor group is equal to the number of printheads attached to the address line associated with the resistor group. Accordingly, in the implementation of FIG. 3 wherein black and tri-color printheads are present, each resistor group 300 includes a black printhead address line resistor 302 and a color printhead address line resistor 304.

As seen in FIG. 3, each resistor within each resistor group is arranged so that it is in series with an address line 118, 120, between the address lead 112, 114 extending from the head driver IC 108 and an associated printhead. For example, a first address line resistor is inserted into the address line between the location at which the address lead is attached to the address line and a first printhead; similarly, a second address line resistor is between the address lead and a second printhead. More particularly, in the example of FIG. 3, a black printhead address line resistor 302 is in-line within the address line 118, between the address lead 112 extending from the head driver IC 108 and the black printhead circuit 104.

In operation, formation of a short circuit 208 pulls the address line 120 to ground, thereby causing a failure of the printhead within which the short circuit is present. The address line is associated with a resistor group 306. After formation of the short circuit, the address line resistor 308 within the resistor group that is in series between the failed printhead and the head driver IC begins to act in a manner similar to the pull-down resistors seen in FIG. 2. The voltage potential of a distal portion 310 of the address line, from the address resistor to the printhead, is held at a voltage potential fixed by the short. However, a medial portion 312 of the address line, from the address resistor to the printhead, may be controlled by the head driver IC, possibly causing a small voltage to be dropped across the address line resistor 308. Because the head driver IC can control the address line, even after formation of a short, the printhead(s) not having a short are still functional.

Figure 4:
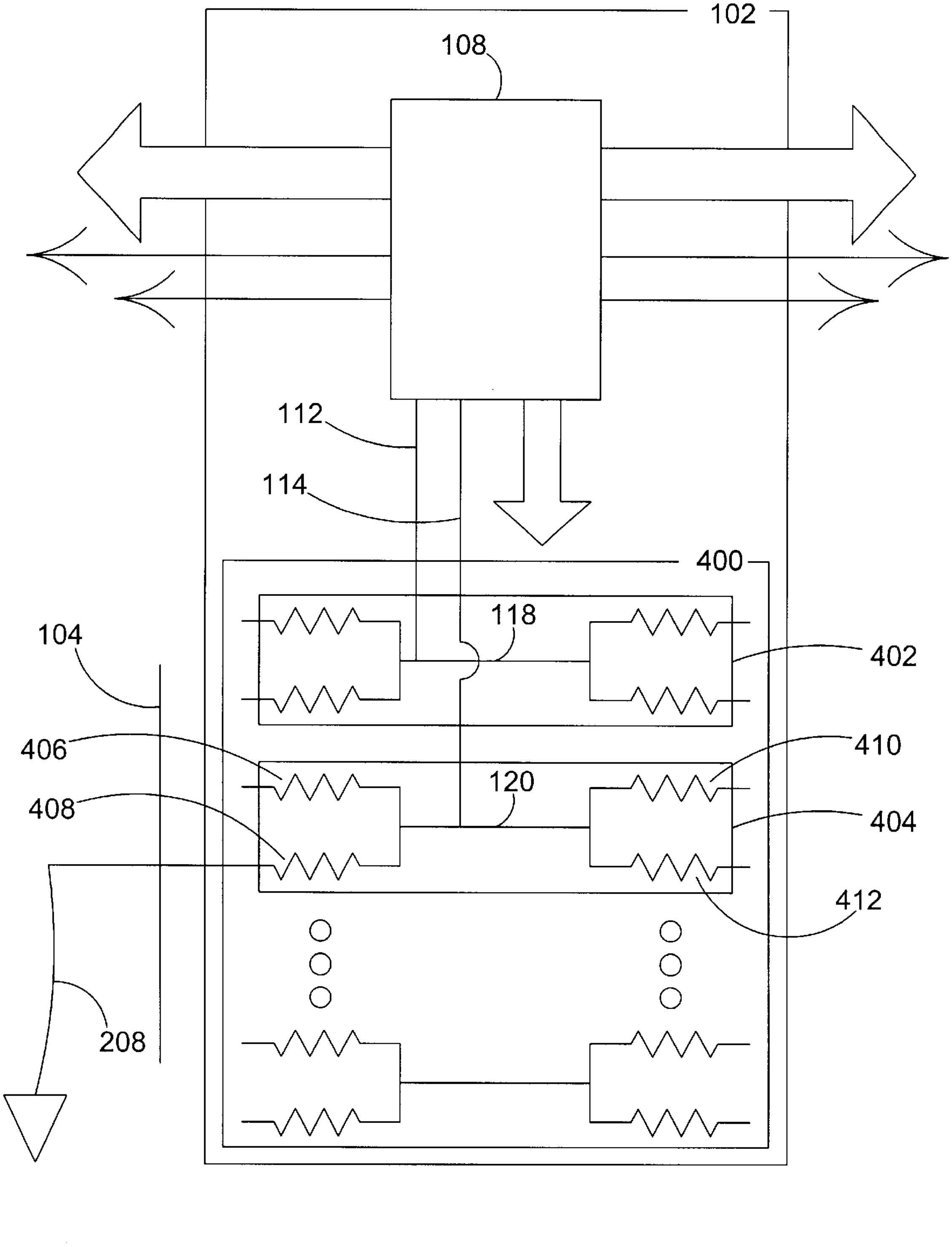
FIG. 4 illustrates an exemplary four printhead implementation of the failure protection circuit.

FIG. 4 shows an enlarged view of the controller card circuit 102, illustrating a second implementation of a failure protection circuit. The failure protection circuit 400 illustrates that the teachings associated with the failure protection circuit 122 can be extended in a manner that would protect any desired number of printheads.

The failure protection circuit 400 prevents a short 208, located within one printhead circuit from impacting the functionality of a plurality of additional printhead circuits driven by the head driver IC 108. For example, where separate black, magenta, cyan and yellow printheads are provided, a short 208 may cause a failure in the black printhead circuit. However, the short would not prevent the other three printheads from functioning.

The second exemplary failure protection circuit 400 contains a plurality of resistor groups 402, 404. Each resistor group is associated with one address line, which extends into four (or any alternative number) printheads. Each resistor group includes one address line resistor 406 in communication with each printhead. The number of resistor groups may be equal to the number of address lines that extend into more than one printhead. The number of resistors in each resistor group is equal to the number of printheads attached to the address line. Accordingly, in the implementation of FIG. 4 wherein black, magenta, cyan and yellow printheads are present, each resistor group includes a black printhead address line resistor 406, a magenta printhead address line resistor 408, a cyan printhead address line resistor 410, and a yellow printhead address line resistor 412.

As seen in FIG. 4, each resistor within each resistor group is arranged so that it is in series with an address line 118, 120, between the address lead 112, 114 extending from the head driver IC 108 and an associated printhead. For example, a first printhead address line resistor is inserted into the address line between the location at which the address lead is attached to the address line and a first printhead; similarly, a second resistor is between the address lead and a second printhead. More particularly, in the example of FIG. 4, a magenta printhead address line resistor 408 is in-line within the address line 120, between the address lead 114 extending from the head driver IC 108 and the magenta printhead circuit.

Figure 5:
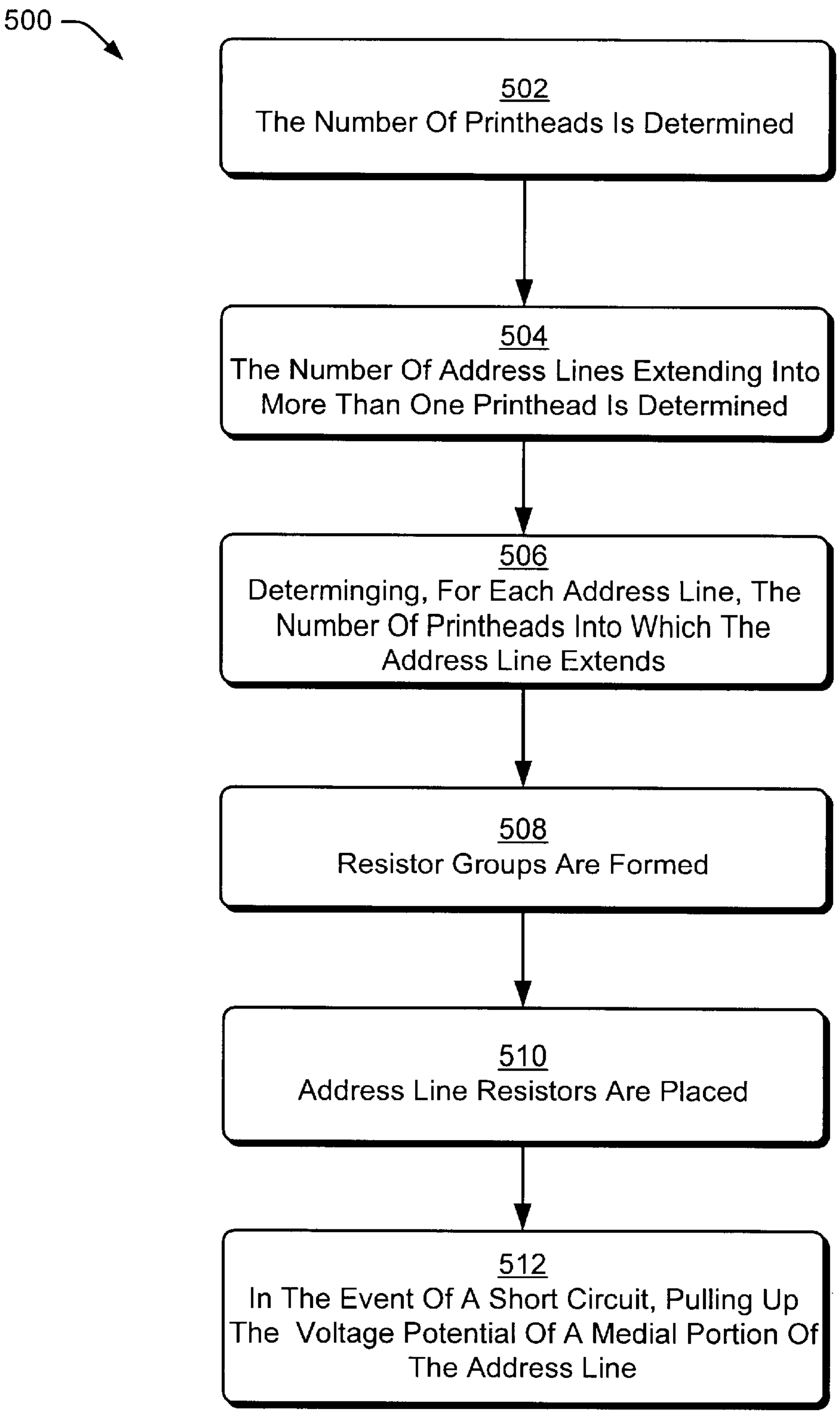
FIG. 5 is a flow diagram that describes an exemplary method to oppose a short circuit failure mechanism in a printer drive circuit.

FIG. 5 shows a method 500 by which a printer may be designed, so that a short circuit causing a failure within one printhead within the printer may be prevented from causing a failure in another printhead within the printer.

At block 502, the number of printheads within the printer is determined. Where more than one printhead is present, there is a possibility that a short circuit in one printhead will cause a failure within a second printhead.

At block 504, the number of address lines that extend into more than one printhead is determined. In some applications, different printheads may require different numbers of address lines; accordingly, some address lines may extend into more than one printhead and other address lines may extend into only one printhead.

At block 506, the number of printheads into which each address line extends is determined. Where an address line extends into more than one printhead, a resistor group including two or more address line resistors will be required.

At block 508, resistor groups are formed for each address line extending into more than one printhead. One resistor group is associated with each address line that extends into more than one printhead. Each resistor group typically includes as many resistors as there are printheads into which the address line extends.

At block 510, address line resistors are placed in-line within each address line that extends into more than one printhead. An address line resistor is located in-line within each address line, between a printhead into which the address line extends and the address lead attached to the address line, extending from a head driver IC that drives the address line.

At block 512, in the event of a short circuit, wherein the distal portion of the address line is shorted to ground or other potential, the voltage potential of the medial portion of the address line is still under the control of the head driver IC. Therefore, the head driver IC is able to pull up the medial portion of the address lines, between the address line resistors.

CONCLUSION

A failure protection circuit may be used to prevent a failure in one printhead within a printer, typically caused by the short circuiting of an address line to ground, from resulting in a failure in another printhead within the printer. An exemplary failure protection circuit includes a plurality of resistor groups associated with a similar number of address lines, wherein each resistor within the group is located in series between an address lead extending from a head driver IC to the address line and the printhead with which the resistor is associated. If the address line within the printhead becomes shorted a voltage drops across the address line resistor, the voltage potential of a medial portion of the address line may still be controlled by the head driver IC.

Although the disclosure has been described in language specific to structural features and/or methodological steps, it is to be understood that the appended claims are not limited to the specific features or steps described. Rather, the specific features and steps are exemplary forms of implementing this disclosure. For example, while two and four printhead versions of the failure protection circuit have been illustrated, it is clear that the teachings could be extended to printers having any number of printheads.

What is claimed is:

1. A method manufacturing a short resistant circuit, comprising:

placing a first address line resistor in-line within a first address line, between a first address lead extending from a head driver and a first printhead to which the address line extends;

placing a second address line resistor in-line within the first address line, between the first address lead extending from the head driver and a second printhead to which the address line extends; and confining the address line resistors to an area protected from contamination.

2. The method of claim 1, additionally comprising:

placing a third address line resistor in-line within a first address line, between a first address lead extending from a head driver and a third printhead to which the address line extends; and placing a fourth address line resistor in-line within the first address line, between the first address lead extending from the head driver and a fourth printhead to which the address line extends.

3. The method of claim 1, additionally comprising:

in the event of formation of a short circuit on a distal portion of the first address line, maintaining sufficient voltage in the medial portion of the first address line between the address lead extending from the head driver and the first and second address line resistors.

4. A method of manufacturing a short circuit resistant printer, comprising:

forming a failure protection circuit, comprising a plurality of address line resistors in-line within an address line, each address line resistor between an address lead extending from a head driver and a printhead to which the address line extends;

in the event of formation of a short circuit on a distal portion of the address line, maintaining sufficient voltage in the medial portion of the first address line; and confining the failure protection circuit to an area not within the printhead.

5. A method of manufacturing a short circuit resistant printer, comprising:

forming a resistor group, associated with an address line, wherein the resistor group comprises a plurality of address line resistors in-line within the address line, each address line resistor between an address lead extending from a head driver and a printhead to which the address line extends; and in the event of a short circuit on a distal portion of the address line, pulling up a voltage potential of the medial portion of the address line; and confining the resistor group to an area protected from contamination and not within the printhead.

6. A failure protection circuit, to protect an address line in communication with a head driver and at least two printheads, the failure protection circuit comprising:

a first address line resistor, located in-line with the address line, between the head driver and a first of the at least two printheads;

a second address line resistor, located in-line with the address line, between the head driver and a second of the at least two printheads; and wherein the first and second address line resistors are located in a region protected from contamination.

7. The failure protection circuit of claim 6, additionally comprising:

a third address line resistor, located in-line with the address line, between the head driver and a third of the at least two printheads; and a fourth address line resistor, located in-line with the address line, between the head driver and a fourth of the at least two printheads.

8. A printer, comprising:

at least two printheads;

a head driver IC to operate an address bus in communication with the at least two printheads; and a failure protection circuit, located in a region protected from contamination, comprising at least two address line resistors, each address line resistor in-line with an address line within the address bus, each of the at least two address lines resistors located between an address lead extending from the head driver and one of the at least two printheads.

9. A protection circuit for an address bus extending into at least two printheads of a printer, the protection circuit comprising:

a resistor group, located in a region protected from contamination, associated with each address line extending into the at least two printheads; and an address line resistor, associated with each of the at least two printheads, contained within each resistor group and in-line with an address line associated with the resistor group.

10. The protection circuit of claim 9, additionally comprising:

a medial portion of each address line, defined between address line resistors; and at least two distal portions of each address line, defined between address line resistors and printheads.

11. A method of designing a short circuit resistant printer, comprising:

determining a number of printheads to be present within the printer;

determining a number of address lines to be extended into more than one printhead;

forming as many resistor groups as the number of address lines that extend into the more than one printhead and locating the resistor groups in a region protected from contamination;

associating each resistor group with an address line that extends into more than one printhead; and including as many resistors in each resistor group as there are printheads into which an address line associated with the resistor group extends.

12. The method of claim 11, additionally comprising:

placing address resistors in-line within each address line that extends into at least two printheads, with one address resistor placed between a head driver and each of the at least two printheads.

13. The method of claim 11, additionally comprising:

in the event of a short between a distal portion of the address line and round, pulling a voltage potential of a medial portion of the address line up with an address lead extending from the head driver IC.

* * * * *